(12) United States Patent
Hu et al.

(10) Patent No.: US 12,524,586 B2
(45) Date of Patent: Jan. 13, 2026

(54) METHOD AND DEVICE FOR JUDGING THE PRINTABILITY OF FOOD MATERIALS

(71) Applicants: Hainan Tropical Ocean University, Sanya (CN); Sanya Yazhou Bay South China Sea Deep Water Research Institute Co., Ltd, Sanya (CN)

(72) Inventors: Yaqin Hu, Sanya (CN); Gaoshang Li, Sanya (CN); Zhiheng Hu, Sanya (CN); Lingping Hu, Sanya (CN); Jiayin Huang, Sanya (CN); Yuanzhe Xu, Sanya (CN); Yu Song, Sanya (CN)

(73) Assignees: HAINAN TROPICAL OCEAN UNIVERSITY, Sanya (CN); SANYA YAZHOU BAY SOUTH CHINA SEA DEEP WATER RESEARCH INSTITUTE CO., LTD, Sanya (CN)

( * ) Notice: Subject to any disclaimer, the term of this patent is extended or adjusted under 35 U.S.C. 154(b) by 729 days.

(21) Appl. No.: 17/988,251

(22) Filed: Nov. 16, 2022

(65) Prior Publication Data
US 2023/0214552 A1  Jul. 6, 2023

(30) Foreign Application Priority Data
Jan. 6, 2022 (CN) .......................... 202210008211.4

(51) Int. Cl.
 G06F 30/20 (2020.01)
 G06F 111/10 (2020.01)
 G06F 113/10 (2020.01)
(52) U.S. Cl.
 CPC .......... *G06F 30/20* (2020.01); *G06F 2111/10* (2020.01); *G06F 2113/10* (2020.01)

(58) Field of Classification Search
 CPC .. G06F 30/20; G06F 2111/10; G06F 2113/10; G06Q 10/0639
 See application file for complete search history.

(56) References Cited

FOREIGN PATENT DOCUMENTS

CN  105881694 A  8/2016

OTHER PUBLICATIONS

Pulatsu, Ezgi, et al. "Restructuring cookie dough with 3D printing: Relationships between the mechanical properties, baking conditions, and structural changes." Journal of Food Engineering 319 (2022): 110911. (Year: 2022).*

(Continued)

*Primary Examiner* — Chuen-Meei Gan
(74) *Attorney, Agent, or Firm* — WPAT, PC

(57) ABSTRACT

The invention provides a method and a device for judging the printability of food materials, and the method includes the following: acquire the plasticity of the food materials to be judged; acquire the measured values of each of the influencing factors of the 3D printing effect of food materials to be judged; and acquire the first correlation value between the plasticity and each of the influencing factors and the second correlation value between each of the influencing factors; in addition, acquire the maximum influencing factor of the 3D printing effect of food materials to be judged, and normalize the measured values according to the measured value of the maximum influencing factor and the second correlation value; what's more, construct a judging model. And the invention can accurately judge the printability of the same food materials under different conditions by specific numerical values.

8 Claims, 25 Drawing Sheets

(56) References Cited

OTHER PUBLICATIONS

Kim, Hyun Woo, et al. "Effect of hydrocolloids on rheological properties and printability of vegetable inks for 3D food printing." Journal of food science 83.12 (2018): 2923-2932. (Year: 2018).*

Theagarajan, Radhika, J. A. Moses, and C. Anandharamakrishnan. "3D extrusion printability of rice starch and optimization of process variables." Food and Bioprocess Technology 13.6 (2020): 1048-1062. (Year: 2020).*

Vancauwenberghe, Valérie, et al. "Pectin based food-ink formulations for 3-D printing of customizable porous food simulants." Innovative Food Science & Emerging Technologies 42 (2017): 138-150. (Year: 2017).*

Pan Yanmo et al., "Effects of cryoprotectant on 3D printability of frozen shrimp surimi based on principal component analysis", Transactions of the Chinese Society of Agricultural Engineering, Sep. 2021, pp. 266-275, vol. 37, No. 17.

* cited by examiner

METHOD AND DEVICE FOR JUDGING THE PRINTABILITY OF FOOD MATERIALS

TECHNICAL FIELD

The invention relates to the technical field of food processing, in particular to a method and a device for judging the printability of food materials.

BACKGROUND 3D printing is a new technology of additive manufacturing, which refers to the use of computer signals to create 3D objects by accumulating layers of materials to form different shapes. 3D printing technology has the characteristics of personalized customization and forming without mold, and has great potential in food processing. It can generate complex 3D shapes, create complex geometric objects, and accurately customize food ingredients according to personal health needs and taste preferences. For example, customizing 3D printed meals for people who have difficulty chewing and swallowing (such as dysphagia patients) can increase the attractiveness of food by using food with interesting shapes instead of thickened liquid food. Although 3D printing technology has great application potential in food, some food materials have weak structural stability or are difficult to integrate other ingredients, so it is not suitable for 3D printing.

At present, there are many types of food raw materials such as surimi, starch, colloid, etc. which are successfully produced and processed by 3D printing. Because these materials can form the target shape by mutual adhesion or curing after being extruded from the printer nozzle under appropriate shear force. Therefore, the texture characteristics, rheological characteristics and gel characteristics of these printable food materials will affect the printability of the materials. Viscosity will affect the fluidity of materials during extrusion and the adhesive molding ability after extrusion. Hardness, elasticity and gel strength are related to the supporting ability of materials after extrusion. In addition, the rheological characteristics can be used to characterize the fluid state of materials, which will affect the extrusion ability and molding ability of materials. Although these characteristics are important for the printability of materials, it is complicated and difficult to use a certain characteristic alone to characterize the printability of food materials because of the interaction and correlation of these influencing factors. At present, there is no research on defining the evaluation method of printability of food materials, and it is impossible to represent the printability of materials by specific numerical values. Therefore, it is necessary to define a method for judging the printability of food materials to characterize the printability of materials.

SUMMARY

The purpose of the invention is to provide a method and a device for judging the printability of food materials, so as to solve the problems in the prior technology and accurately judge the printability of the same food materials under different conditions by specific numerical values.

To achieve the above purpose, the present invention provides the following scheme: the present invention provides a method for judging the printability of food materials, and it includes the following steps:

acquire the plasticity of the food materials to be judged according to the 3D printing results of the food materials to be judged;

acquire the measured values of each of the influencing factors according to the influencing factors of the 3D printing effect of the food materials to be judged;

perform correlation analysis on the plasticity and each of the influencing factors according to the measured values of each of the influencing factors and the plasticity, and obtain the first correlation value between the plasticity and each of the influencing factors and the second correlation value between each of the influencing factors;

acquire the influencing factor with the highest correlation with the plasticity according to the first correlation value, namely the maximum influencing factor, and normalize the measured values of each of the influencing factors according to the measured value of the maximum influencing factor and the second correlation value;

construct a judging model according to the measured values of each of the normalized influencing factors and the first correlation value between each of the influencing factors and the plasticity, and the judging model is used for judging the printability of the food materials to be judged.

Preferably, the influencing factors include texture characteristics, gel strength and rheological characteristics.

Preferably, the texture characteristics include hardness, elasticity, resilience and viscosity; and the rheological characteristics include yield stress, viscosity coefficient and Power-law index, wherein the viscosity coefficient and the Power-law index are simulated by a Power-law model.

Preferably, normalizing the measured values of each of the influencing factors includes: multiply the second correlation value between each of the influencing factors and the maximum influencing factor and the measured value of the maximum influencing factor to obtain the normalized processing results of the measured values of each of the influencing factors.

Preferably, the construction of the judging model includes: sum the products of the normalized measured values of each of the influencing factors and the first correlation value between each of the influencing factors and the plasticity to obtain the judging model.

Preferably, after constructing the judging model, it further includes: under the condition to be measured, acquire the measured value of the maximum influencing factor of the food materials to be judged and input it into the judging model to obtain the judging value of the printability of the food materials to be judged under the condition to be measured.

In addition, the invention also provides a device for judging the printability of food materials and it includes the following:

the first data acquisition module is used for acquiring the plasticity of the food materials to be judged according to the 3D printing results of the food materials to be judged;

the second data acquisition module is used for acquiring the measured values of each of the influencing factors of the 3D printing effect of the food materials to be judged;

the correlation analysis module is used for performing correlation analysis on the plasticity and each of the influencing factors according to the measured values of each of the influencing factors and the plasticity, and obtaining the first correlation value between the plasticity and each of the influencing factors and the second correlation value between each of the influencing factors;

the data processing module is used for acquiring the influencing factor with the highest correlation with the plasticity according to the first correlation value, namely the maximum influencing factor, and normalize the measured values of each of the influencing factors according to the measured value of the maximum influencing factor and the second correlation value;

and the judging model constructing module is used for constructing the judging model according to the measured values of each of the normalized influencing factors and the first correlation value between each of the influencing factors and the plasticity, and the judging model is used for judging the printability of the food materials to be judged.

The invention also provides an electronic device comprising a memory, a processor, and a computer program stored in the memory and executable on the processor, and when the processor executes the program, the steps of the method for judging the printability of food materials according to any of claims 1 to 6 are implemented.

The invention also provides a non-transient computer readable storage medium with the computer program stored on, and when the computer program is executed by the processor, the steps of the method for judging the printability of food materials are implemented.

The invention also provides a computer program product comprising the computer program, and when the computer program is executed by the processor, the steps of the method for judging the printability of food materials are implemented.

The invention discloses the following technical effects: the invention discloses a method and a device for judging the printability of food materials. By analyzing the correlation between each of the influencing factors of 3D printing effect of food materials and the correlation between plasticity of food materials and each of the influencing factors, the judging model which can comprehensively consider each of the influencing factors is established. Under the condition to be measured, the numerical characterization of the printability of food materials can be realized only by measuring the measured values of the maximum influencing factors. The printability of the same food materials under different conditions can be accurately judged by the numerical values, which is of great significance for the application of materials in food 3D printing.

BRIEF DESCRIPTION OF DRAWINGS

In order to more clearly explain the embodiments of the present invention or the technical schemes in the prior technology, the following will briefly introduce the drawings that need to be used in the embodiments. Obviously, the drawings in the following description are only some embodiments of the present invention. For those of ordinary skill in the field, other drawings can be obtained according to these drawings without any creative labor.

DETAILED DESCRIPTION OF EMBODIMENTS

The technical schemes in the embodiments of the present invention will be clearly and completely described below with reference to the drawings in the embodiments of the present invention. Obviously, the described embodiments are only part of the embodiments of the present invention, but not all of them. Based on the embodiment of the present invention, all other embodiments obtained by ordinary technicians in the field without creative labor are within the scope of the present invention.

In order to make the above objects, features and advantages of the present invention more obvious and understandable, the present invention will be explained in further detail below with reference to the drawings and detailed description.

Figure 1:
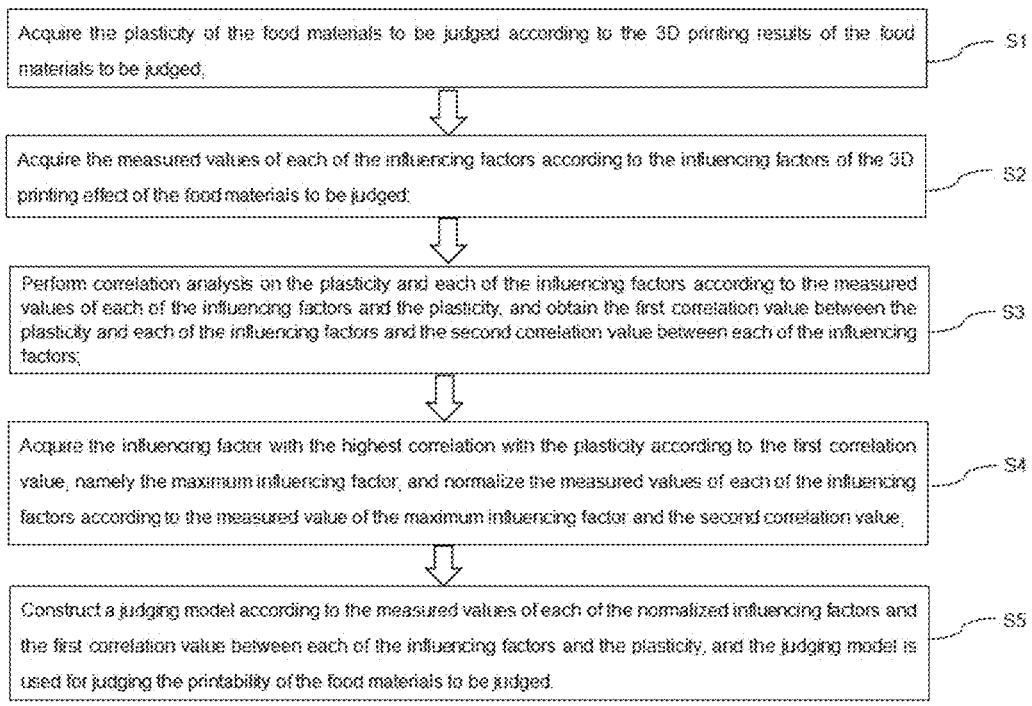
FIG. 1 is a flowchart of the method for judging printability of food materials in the embodiment of the present invention.

Referring to FIG. 1, this embodiment provides a method for judging the printability of food materials, and the method includes the following:

S1, Acquiring food materials to be judged, perform 3D printing on the food materials to be judged, and obtain the plasticity of the food materials to be judged based on the printing results.

In this step, the plasticity of the food materials to be judged is characterized by the score value of 3D printing effect. The specific scoring table is as shown in Table 1.

TABLE 1

| Standard | Description | Score |
| --- | --- | --- |
| Complete shape printing | It is used for completing the 10 points of the printed shape with the inclination angle; and 40 points complete printing shapes with all dip angles (75° C., 60° C., 45° C., 30° C.) | 0-40 |
| Acceptability of shape | The shape is intact, has smooth surface and no cross section. | 0-40 |
| Total score | — | 80 |

S2, Acquiring the influencing factors of the 3D printing effect of the food materials to be judged, and measuring the influencing factors to obtain the measured values of each of the influencing factors; wherein the influencing factors include texture characteristics, gel strength and rheological characteristics.

In this step, the texture characteristics include, but are not limited to, hardness, elasticity, resilience and viscosity; and the rheological characteristics include, but are not limited to, yield stress $\tau_y$, viscosity coefficient k and Power-law index n; wherein the viscosity coefficient k and the Power-law index n are simulated by the Power-law model ($\tau = k\lambda^n$, wherein $\tau$ represents shear stress and $\lambda$ represents angular frequency).

S3, Perform correlation analysis on the plasticity, texture characteristics, gel strength and rheological characteristics according to the measured values of each of the influencing factors and the plasticity, and obtain the first correlation value between the plasticity and each of the influencing factors and the second correlation value between each of the influencing factors.

S4, Acquire the influencing factor with the highest correlation with the plasticity according to the first correlation value, namely the maximum influencing factor, and normalize the measured values of each of the influencing factors according to the measured value of the maximum influencing factor and the second correlation value.

In this step, normalizing the measured values of each of the influencing factors includes: multiply the second correlation value between each of the influencing factors and the maximum influencing factor and the measured value of the maximum influencing factor to obtain the normalized processing results of the measured values of each of the influencing factors. Because the levels of the measured values of each of the influencing factors are very different, the measured values of each of the influencing factors can be at the same level through normalization.

S5, Construct a judging model according to the measured values of each of the normalized influencing factors and the first correlation value between each of the influencing factors and the plasticity, and the judging model is used for judging the printability of the food materials to be judged.

In this step, the construction of the judging model includes: sum the products of the normalized measured values of each of the influencing factors and the first correlation value between each of the influencing factors and the plasticity to obtain the judging model.

And the judging model is specifically shown in the following formula:

$$Y = \sum_{i=1}^{N} P_i \times (G_i a_{max})$$

in the formula, Y represents the judging value of the printability of the food materials to be judged, N represents the total number of the influencing factors, $P_i$ represents the first correlation value between the i-th influencing factor and the plasticity. And the product of $G_i$ and $a_{max}$ represents the measured value of the i-th influencing factor after normalization, $G_i$ represents the second correlation value between the i-th influencing factor and the maximum influencing factor, and $a_{max}$ represents the measured value of the maximum influencing factor. Therefore, through the judging model, the printability of food materials to be judged can be numerically characterized.

In addition, after constructing the judging model, it also includes the following steps:

S6, Under the condition to be measured, acquire the measured value of the maximum influencing factor of the food materials to be judged and input the measured value into the judging model to obtain the judging value of the printability of the food materials to be judged under the condition to be measured.

Therefore, by the method of the invention, the numerical characterization of printability can be realized only by measuring the measured value of the maximum influencing factor, and the printability of the same food materials under different conditions can be accurately judged by the numerical values.

This embodiment also provides a device for judging the printability of food materials. The device for judging the printability of food materials described below and the method for judging the printability of food materials described above can be mutually referenced. And the device includes:

The first data acquisition module is used for acquiring the plasticity of the food materials to be judged according to the 3D printing results of the food materials to be judged.

The second data acquisition module is used for acquiring the measured values of each of the influencing factors of the 3D printing effect of the food materials to be judged; And as a preferred scheme, the influencing factors include texture characteristics, gel strength and rheological characteristics. What's more, the texture characteristics include hardness, elasticity, resilience and viscosity; and the rheological characteristics include yield stress, viscosity coefficient and Power-law index, wherein the viscosity coefficient and the Power-law index are simulated by a Power-law model.

The correlation analysis module is used for performing correlation analysis on the plasticity and each of the influencing factors according to the measured values of each of the influencing factors and the plasticity, and obtaining the first correlation value between the plasticity and each of the influencing factors and the second correlation value between each of the influencing factors.

The data processing module is used for acquiring the influencing factor with the highest correlation with the plasticity according to the first correlation value, namely the maximum influencing factor, and normalize the measured values of each of the influencing factors according to the measured value of the maximum influencing factor and the second correlation value; And as a preferred scheme, the method of normalizing includes: multiply the second correlation value between each of the influencing factors and the maximum influencing factor and the measured value of the maximum influencing factor to obtain the normalized processing results of the measured values of each of the influencing factors.

In addition, the judging model constructing module is used for constructing the judging model according to the measured values of each of the normalized influencing factors and the first correlation value between each of the influencing factors and the plasticity, and the judging model is used for judging the printability of the food materials to be judged. And as preferred scheme, the construction of the judging model includes: sum the products of the normalized measured values of each of the influencing factors and the first correlation value between each of the influencing factors and the plasticity to obtain the judging model. What's more, under the condition to be measured, acquire the measured value of the maximum influencing factor of the food materials to be judged and input it into the judging model to obtain the judging value of the printability of the food materials to be judged under the condition to be measured.

This embodiment also provides an electronic device, which may include a processor, a communication interface, a memory and a communication bus, wherein the processor, the communication interface and the memory communicate with each other through the communication bus. The processor can call the logic instructions in the memory to execute the method for judging the printability of food materials.

In addition, the above-mentioned logic instructions in the memory can be realized in the form of software functional units and can be stored in a computer readable storage medium when sold or used as an independent product. Based on this understanding, the part of the technical scheme of the present invention that essentially contributes to the prior technology or the part of the technical scheme can be embodied in the form of a software product, and the software product is stored in a storage medium and includes a number of instructions to make a computer device (which can be a personal computer, a server, or a network device, etc.) execute all or part of the steps of the methods described in each of the embodiments of the present invention. What's more, the aforementioned storage mediums include: U disk, mobile hard disk, Read-Only Memory (ROM), Random Access Memory (RAM), magnetic disk or optical disk and other mediums that can store program codes.

On the other hand, this embodiment also provides the computer program product, which includes the computer program that can be stored on the non-transient computer readable storage medium. When the computer program is executed by the processor, the computer can execute the above-mentioned method for judging the printability of food materials.

On the other hand, this embodiment also provides the non-transient computer readable storage medium with the computer program stored on. And when the computer program is executed by the processor, the method for judging the printability of food materials provided above is completed.

In order to further judge the effectiveness of the method for judging the printability of food materials of the present invention, the method of the present invention is explained in detail through four different embodiments.

Embodiment 1

Figure 2:
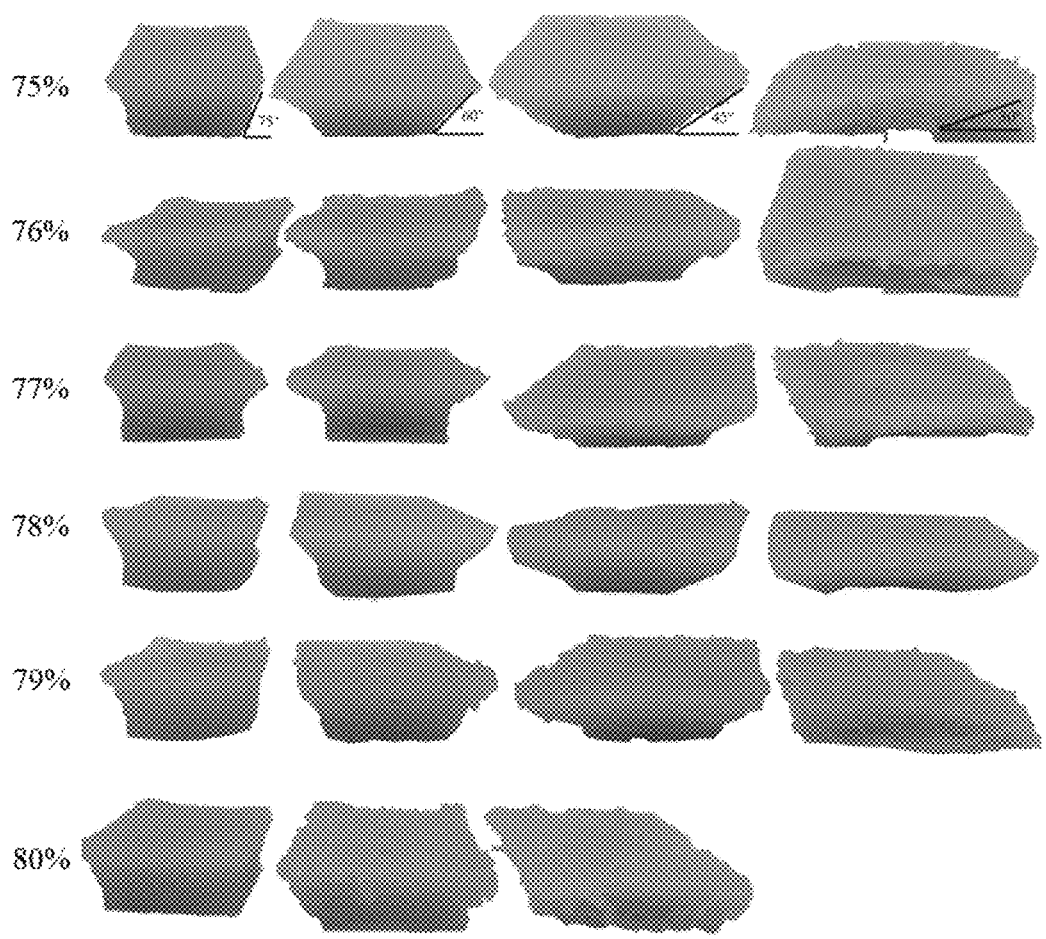
FIG. 2 is a 3D printing effect diagram of the *Pennahia argentata* surimi with different water contents at different inclination angles in Embodiment 1 of the present invention.
Figure 3:
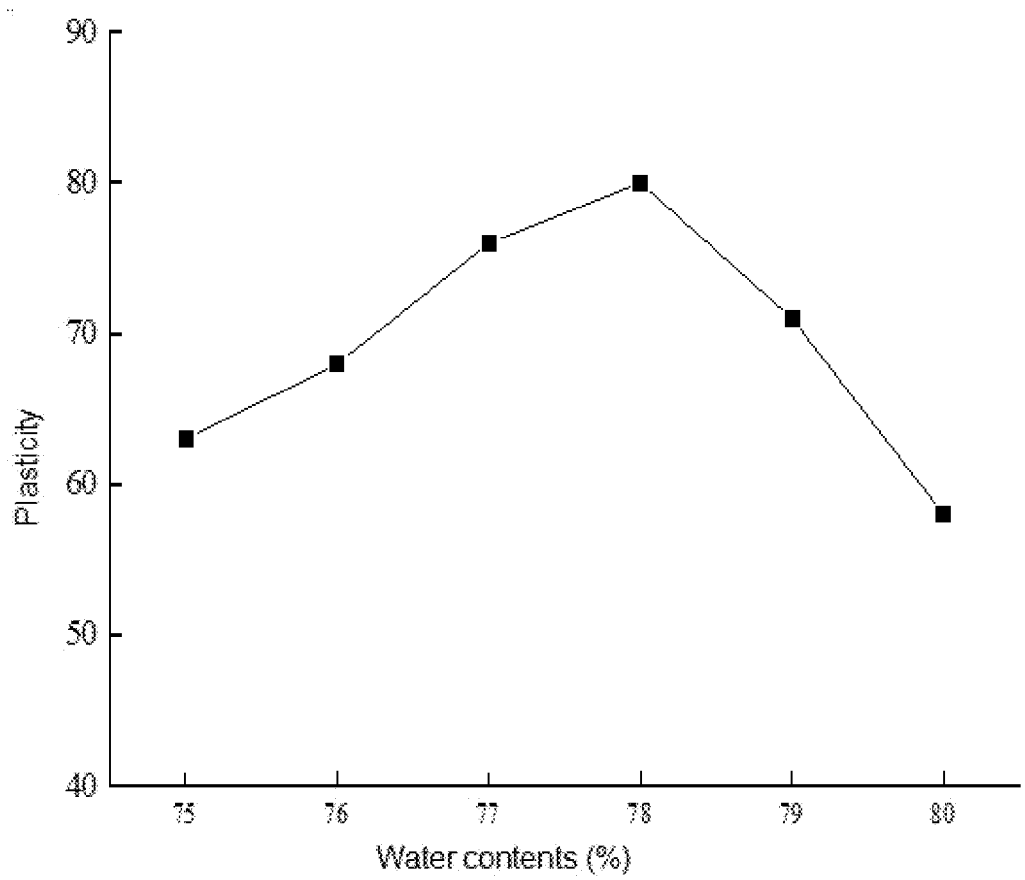
FIG. 3 is the score results of characterizing the plasticity of the *Pennahia argentata* surimi with different water contents in Embodiment 1 of the present invention.
Figure 4:
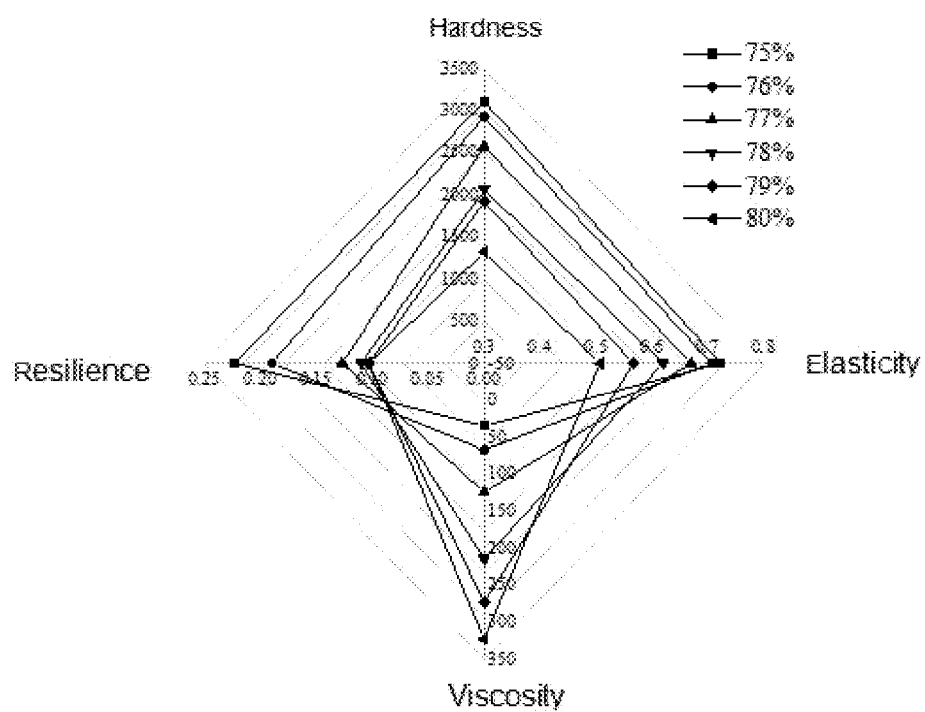
FIG. 4 is the measured results of texture characteristics of the *Pennahia argentata* surimi with different water contents in Embodiment 1 of the present invention.
Figure 5:
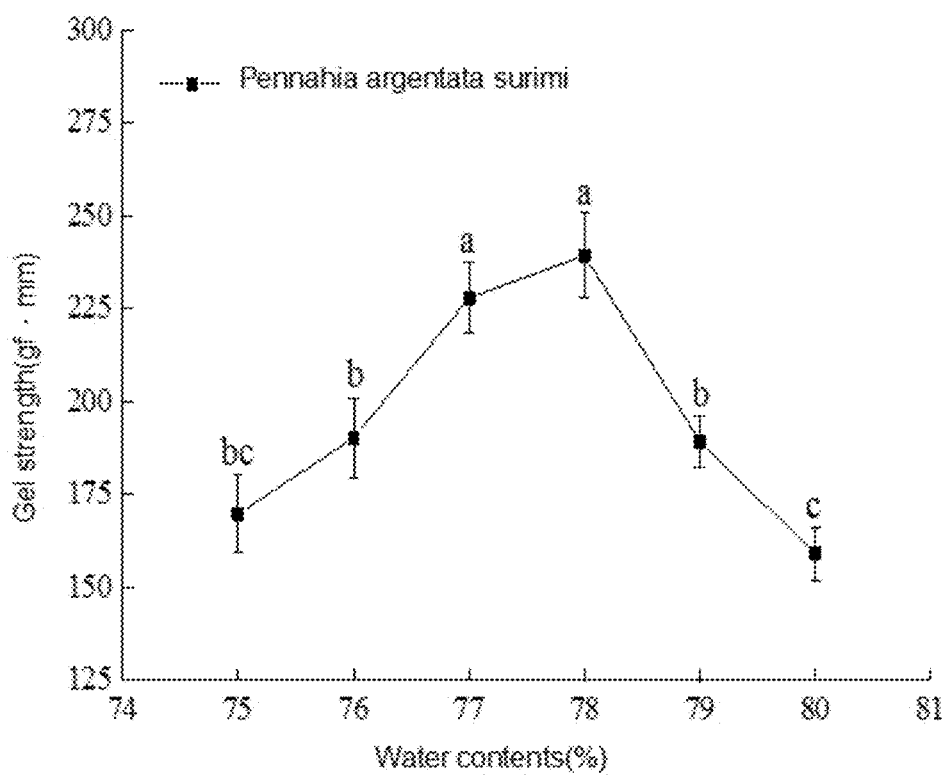
FIG. 5 is the measured results of gel strength of the *Pennahia argentata* surimi with different water contents in Embodiment 1 of the present invention.
Figure 6:
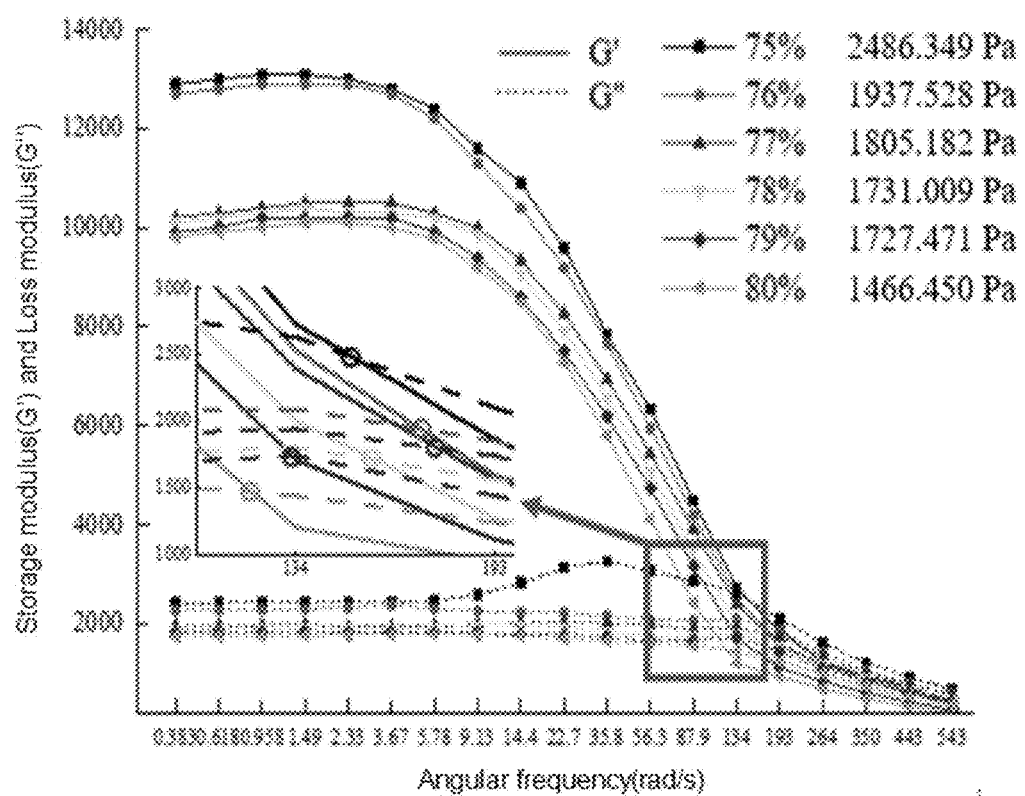
FIG. 6 is the measured results of yield stress of the *Pennahia argentata* surimi with different water contents in Embodiment 1 of the present invention.
Figure 7:
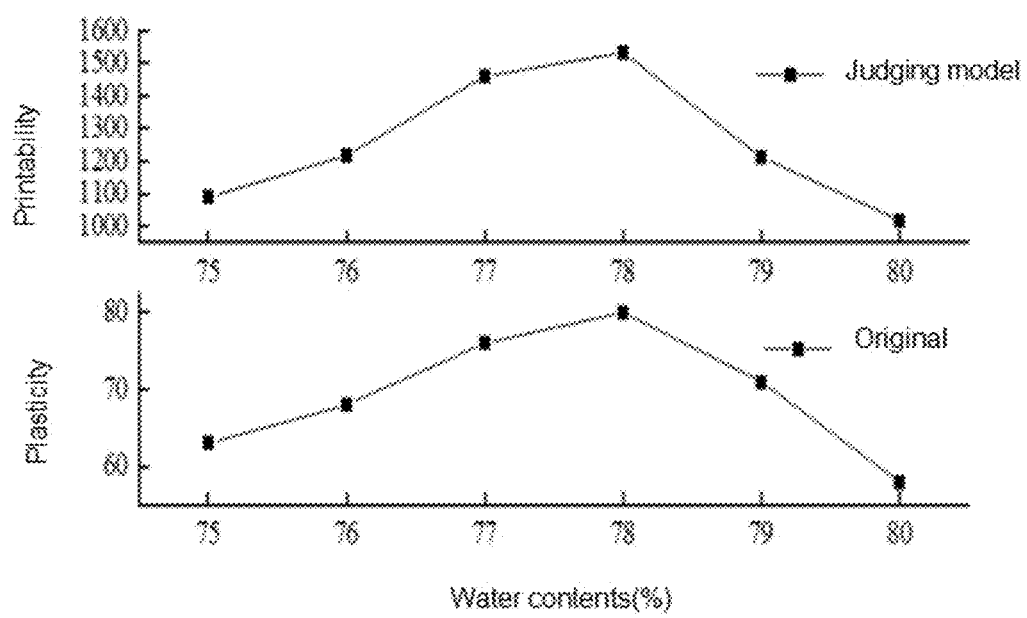
FIG. 7 is the schematic diagram of the judged results of 3D printability of the *Pennahia argentata* surimi with different water contents in Embodiment 1 of the present invention.

In this embodiment, the 3D printability of *Pennahia argentata* surimi with different water contents is judged.

Wherein FIG. 2 is the 3D printing effect diagram of the *Pennahia argentata* surimi with different water contents at different inclination angles; FIG. 3 is the score results of characterizing the plasticity of the *Pennahia argentata* surimi with different water contents; FIG. 4 is the measured results of texture characteristics of the *Pennahia argentata* surimi with different water contents; FIG. 5 is the measured results of gel strength of the *Pennahia argentata* surimi with different water contents; FIG. 6 is the measured results of yield stress of the *Pennahia argentata* surimi with different water contents; And FIG. 7 is the judged results of 3D printability of the *Pennahia argentata* surimi with different water contents. The viscosity coefficient k and Power-law index n of *Pennahia argentata* surimi with different water contents are shown in Table 2, and the correlation analysis results are shown in Table 3.

From Table 3, it can be seen that gel strength is the maximum influence factor on the 3D printability of *Pennahia argentata* surimi with different water contents. Therefore, after normalizing the other influence factors based on the measured value of the gel strength, the judging model is established, as shown in the following formula:

$$Y=0.133*(0.167a)-0.084*(0.115a)+0.207*(0.270a)-0.293*(0.268a)+0.905a-0.006*(0.048a)-0.102*(0.076a)-0.104*(0.139a)$$

where a represents the measured value of the gel strength of the *Pennahia argentata* surimi with different water contents.

According to FIG. 7, the influence results of 3D printability obtained from the judging model are consistent with the actual printing effect of *Pennahia argentata* surimi with different water contents.

TABLE 2

| | | $\tau = k\lambda^n$ | | |
|---|---|---|---|---|
| Samples | | k | n | $R^2$ |
| Pennahia argentata surimi with different water contents | 75% | 3866.34 | −0.1358 | 0.952 |
| | 76% | 3921.028 | −0.1916 | 0.983 |
| | 77% | 4987.696 | −0.3226 | 0.955 |
| | 78% | 6913.774 | −0.3549 | 0.983 |
| | 79% | 7234.358 | −0.4208 | 0.977 |
| | 80% | 7914.072 | −0.441 | 0.979 |

TABLE 3

|  |  | Plasticity | Water contents | Hardness | Viscosity | Elasticity | Resilience | Gel strength | k | n | Yield stress |
|---|---|---|---|---|---|---|---|---|---|---|---|
| Plasticity | Correlation | 1 | −.079 | .133 | −.084 | .207 | −.293 | .905** | −.006 | −.102 | −.104 |
|  | Significance |  | .756 | .599 | .740 | .411 | .238 | .000 | .982 | .688 | .681 |
| Water contents | Correlation | −.079 | 1 | −.948** | .990** | −.920** | −.862** | −.092 | −.968** | −.974** | −.900** |
|  | Significance | .756 |  | .000 | .000 | .000 | .000 | .715 | .000 | .000 | .000 |
| Hardness | Correlation | .133 | −.948** | 1 | −.952** | .955** | .800** | .167 | −.939** | .910** | .826** |
|  | Significance | .599 | .000 |  | .000 | .000 | .000 | .507 | .000 | .000 | .000 |
| Viscosity | Correlation | −.084 | .990** | −.952** | 1 | −.9199* | −.844** | −.115 | .985** | −.960** | −.850** |
|  | Significance | .740 | .000 | .000 |  | .000 | .000 | .651 | .000 | .000 | .000 |
| Elasticity | Correlation | .207 | −.920** | .955** | −.919** | 1 | .753** | .270** | −.903** | .877** | .762** |
|  | Significance | .411 | .000 | .000 | .000 |  | .000 | .278 | .000 | .000 | .000 |
| Resilience | Correlation | −.293 | −.862** | .800** | −.844** | .753** | 1 | −.268 | −.845** | .918** | .857** |
|  | Significance | .238 | .000 | .000 | .000 | .000 |  | .283 | .000 | .000 | .000 |
| Gel strength | Correlation | .905** | −.092 | .167 | −.115 | .270 | −.268 | 1 | −.048 | −.076 | −.139 |
|  | Significance | .000 | .715 | .507 | .651 | .278 | .283 |  | .850 | .764 | .582 |
| k | Correlation | −.006 | .968** | −.939** | .985** | −.903** | −.845** | −.048 | 1 | −.948** | −.809** |
|  | Significance | .982 | .000 | .000 | .000 | .000 | .000 | .850 |  | .000 | .000 |
| n | Correlation | −.102 | −.974** | .910** | −.960** | .877** | .918** | −.076 | −.948** | 1 | .896** |
|  | Significance | .688 | .000 | .000 | .000 | .000 | .000 | .764 | .000 |  | .000 |
| Yield stress | Correlation | −.104 | −.900** | .826* | −.850** | .762** | .857** | −.139 | −.809** | .896** | 1 |
|  | Significance | .681 | .000 | .000 | .000 | .000 | .000 | .582 | .000 | .000 |  |

Embodiment 2

Figure 8:
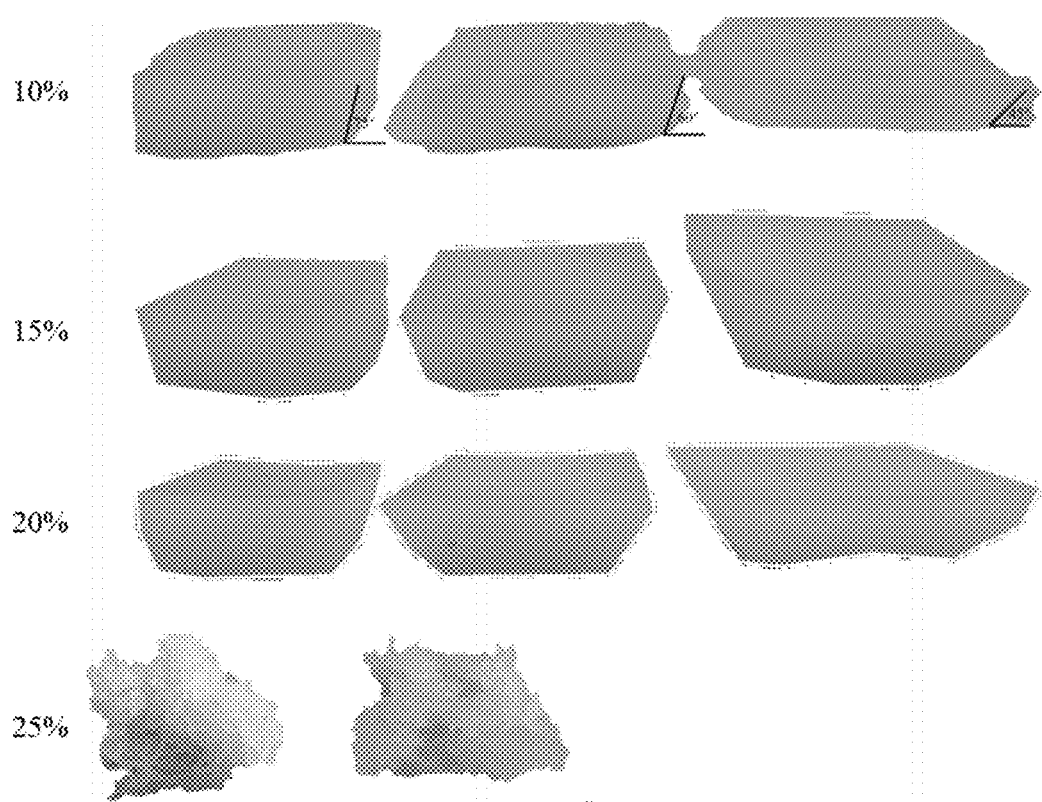
FIG. 8 is a 3D printing effect diagram of the rice starch with different contents at different inclination angles in Embodiment 2 of the present invention.
Figure 9:
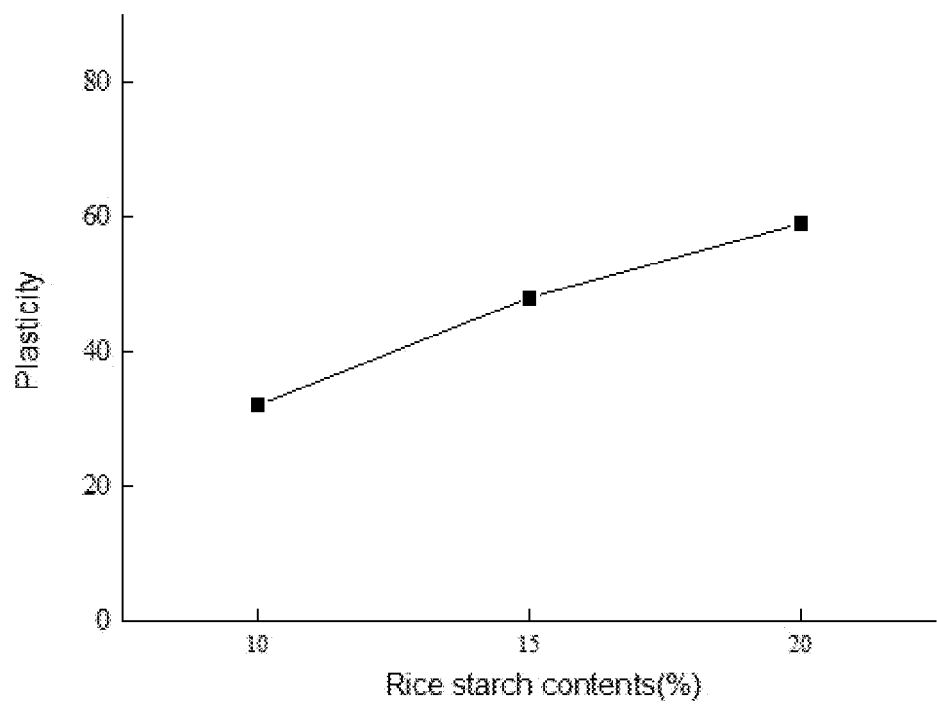
FIG. 9 is the score results of characterizing the plasticity of the rice starch with different contents in Embodiment 2 of the present invention.
Figure 10:
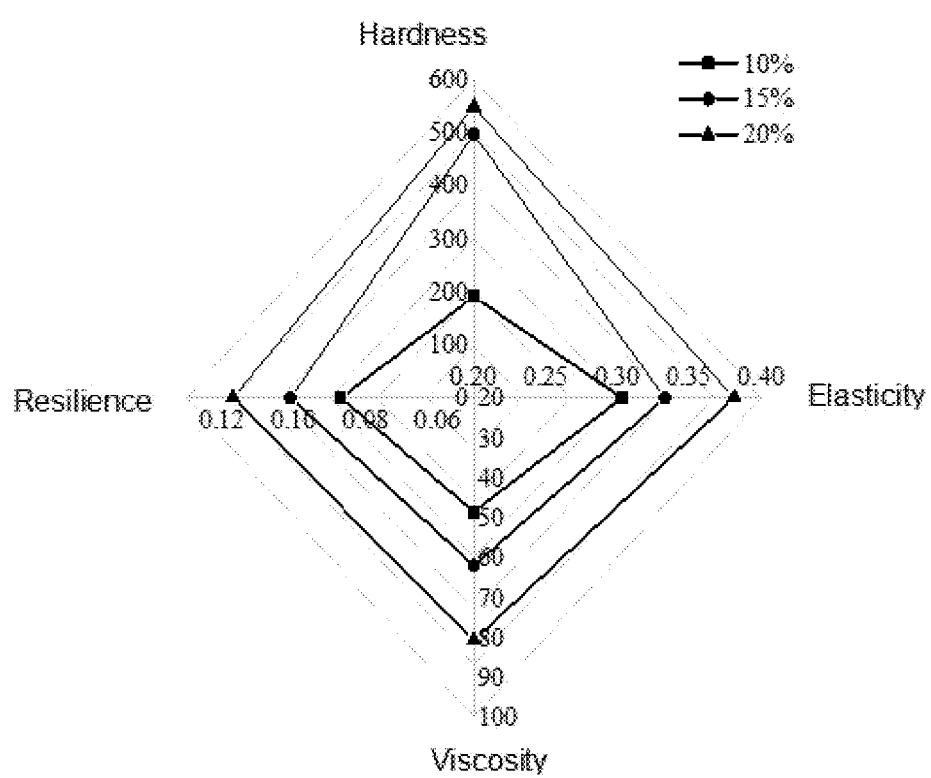
FIG. 10 is the measured results of texture characteristics of the rice starch with different contents in Embodiment 2 of the present invention.
Figure 11:
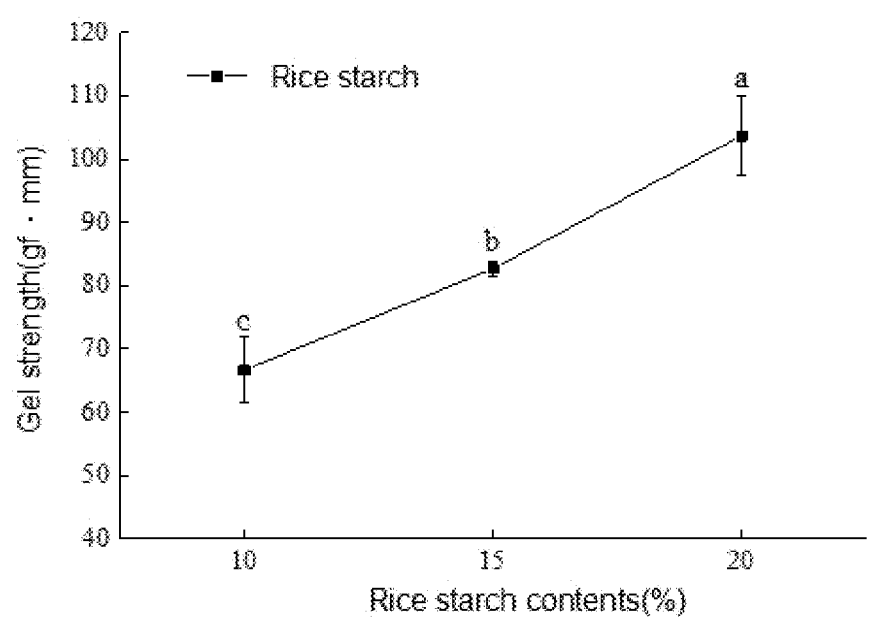
FIG. 11 is the measured results of gel strength of the rice starch with different contents in Embodiment 2 of the present invention.
Figure 12:
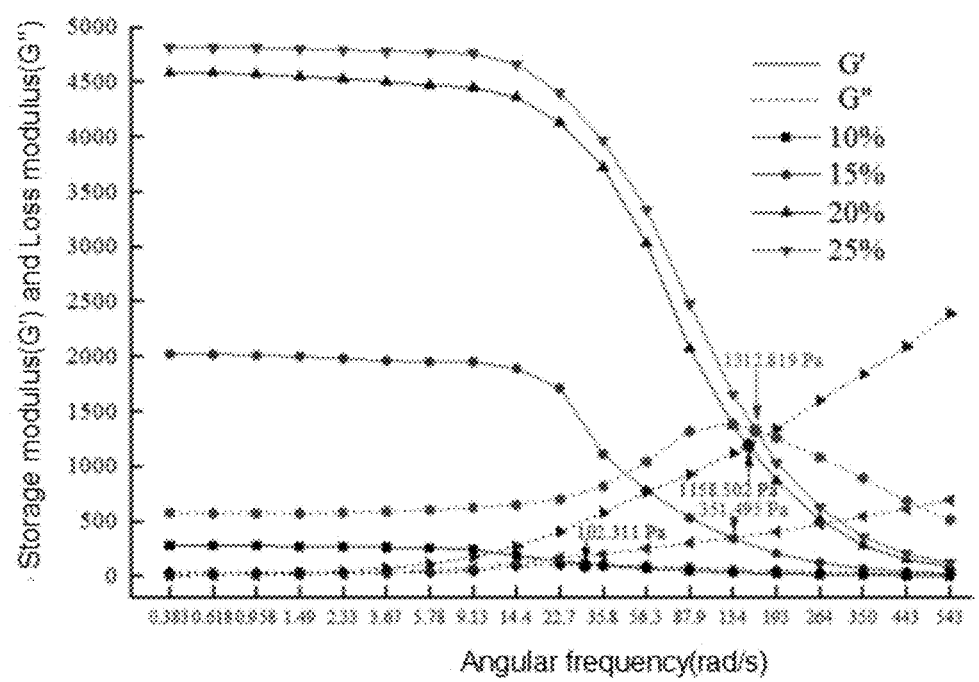
FIG. 12 is the measured results of yield stress of the rice starch with different contents in Embodiment 2 of the present invention.
Figure 13:
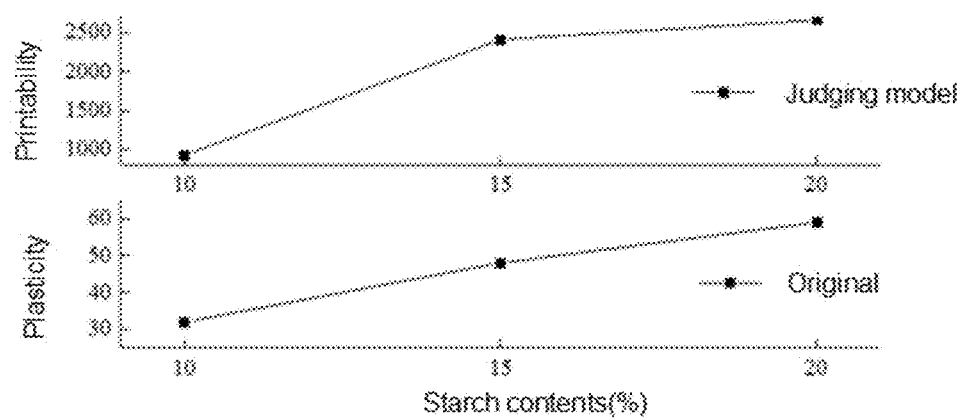
FIG. 13 is the schematic diagram of the judged results of 3D printability of the rice starch with different contents in Embodiment 2 of the present invention.

In this embodiment, the 3D printability of rice starch with different contents is judged.

Wherein FIG. 8 is a 3D printing effect diagram of the rice starch with different contents at different inclination angles; FIG. 9 is the score results of characterizing the plasticity of the rice starch with different contents; FIG. 10 is the measured results of texture characteristics of the rice starch with different contents; FIG. 11 is the measured results of gel strength of the rice starch with different contents; FIG. 12 is the measured results of yield stress of the rice starch with different contents; And FIG. 13 is the judged results of 3D printability of the rice starch with different contents. In addition, the viscosity coefficient k and Power-law index n of rice starch with different contents are shown in Table 4, and the correlation analysis results are shown in Table 5:

TABLE 4

| Samples |  | $\tau = k\lambda^n$ | | |
|---|---|---|---|---|
|  |  | k | n | $R^2$ |
| Rice starch with different contents | 10% | 65.917 | 0.244 | 0.996 |
|  | 15% | 379.75 | 0.236 | 0.999 |
|  | 20% | 922.956 | 0.223 | 0.996 |

TABLE 5

|  |  | Plasticity | Starch contents | Hardness | Elasticity | Viscosity | Resilience | Gel strength | k | n | Yield stress |
|---|---|---|---|---|---|---|---|---|---|---|---|
| Plasticity | Correlation | 1 | .963** | .992** | .860** | .928** | .923** | .931** | .909** | −.863** | .851** |
|  | Significance |  | .000 | .000 | .003 | .000 | .000 | .000 | .001 | .003 | .004 |
| Starch contents | Correlation | .963** | 1 | .923** | .957** | .991** | .955** | .987** | .987** | −.932** | .960** |
|  | Significance | .000 |  | .000 | .000 | .000 | .000 | .000 | .000 | .000 | .000 |
| Hardness | Correlation | .991** | .923** | 1 | .797* | .878** | .886** | .882** | .852** | −.799** | .781* |
|  | Significance | .000 | .000 |  | .010 | .002 | .001 | .002 | .004 | .010 | .013 |
| Elasticity | Correlation | .860** | .957** | .797* | 1 | .965** | .921** | .944** | .982** | −.927** | .979** |
|  | Significance | .003 | .000 | .010 |  | .000 | .000 | .000 | .000 | .000 | .000 |
| Viscosity | Correlation | .928** | .991** | .878** | .965** | 1 | .957** | .990** | .993** | −.917** | .979** |
|  | Significance | .000 | .000 | .002 | .000 |  | .000 | .000 | .000 | .001 | .000 |
| Resilience | Correlation | .923** | .955** | .886** | .921** | .957** | 1 | .922** | .938** | −.862** | .914** |
|  | Significance | .000 | .000 | .001 | .000 | .000 |  | .000 | .000 | .003 | .001 |
| Gel strength | Correlation | .931** | .987** | .882** | .944** | .990** | .922** | 1 | .986** | −.928** | .970** |
|  | Significance | .000 | .000 | .002 | .000 | .000 | .000 |  | .000 | .000 | .000 |
| k | Correlation | .909** | .987** | .852** | .982** | .993** | .938** | .986** | 1 | −.941** | .992** |
|  | Significance | .001 | .000 | .004 | .000 | .000 | .000 | .000 |  | .000 | .000 |
| n | Correlation | −.863** | −.932** | −.799** | −.927** | −.917** | −.862** | −.928** | −.941** | 1 | −.931** |
|  | Significance | .003 | .000 | .010 | .000 | .001 | .003 | .000 | .000 |  | .000 |
| Yield stress | Correlation | .851** | .960** | .781* | .979** | .979** | .914** | .970** | .992** | −.931** | 1 |
|  | Significance | .004 | .000 | .013 | .000 | .000 | .001 | .000 | .000 | .000 |  |

As can be seen from Table 5, hardness is the maximum influencing factor of 3D printability of rice starch with different contents. Therefore, after normalizing the other influencing factors based on the measured value of hardness, the judging model is established, as shown in the following formula:

$$Y=0.991b+0.860*(0.797b)+0.928*(0.878b)+0.923*(0.886b)+0.931*(0.882b)+0.909*(0.852b)-0.863*(0.799b)+0.851*(0.781b)$$

where b represents the measured value of the hardness of the rice starch with different contents.

According to FIG. 13, the influence results of 3D printability obtained from the judging model are consistent with the actual printing effect of rice starch with different contents.

Embodiment 3

Figure 14:
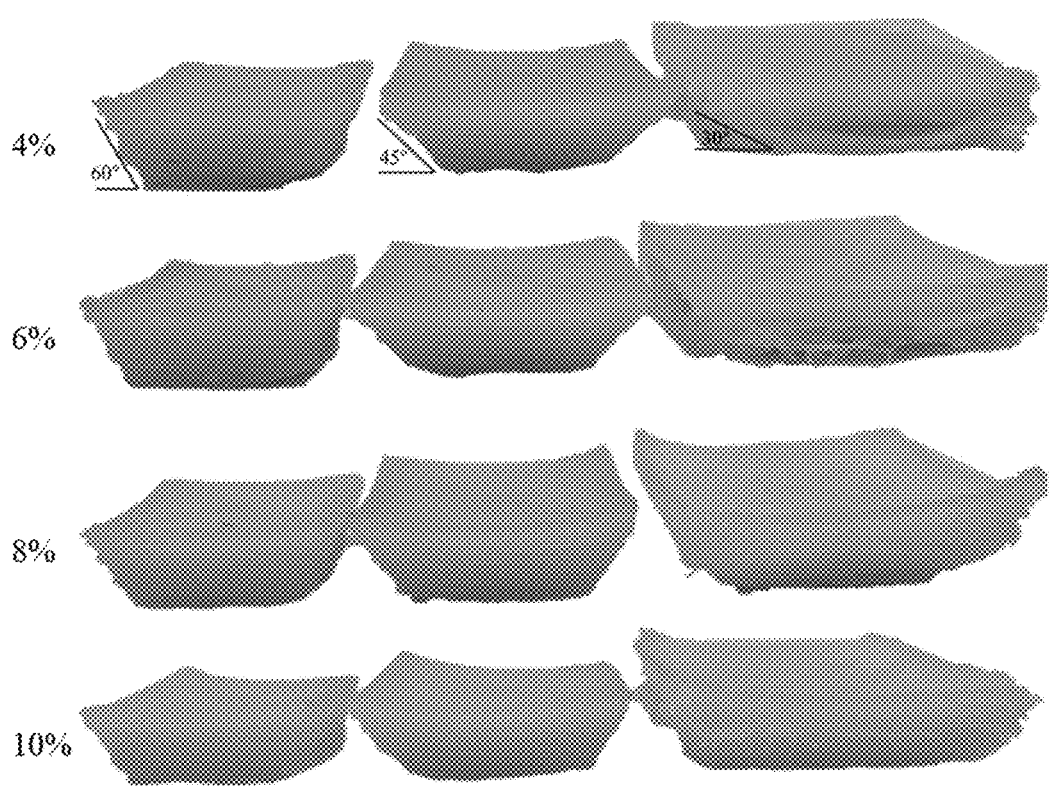
FIG. 14 is a 3D printing effect diagram of the *Pennahia argentata* surimi with different contents of rice starch at different inclination angles in Embodiment 3 of the present invention.
Figure 15:
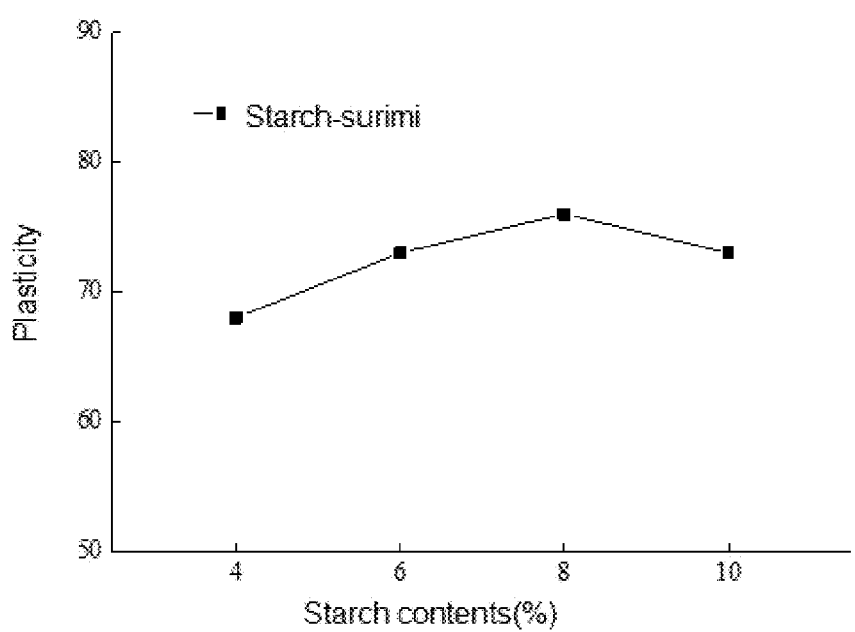
FIG. 15 is the score results of characterizing the plasticity of the *Pennahia argentata* surimi with different contents of rice starch in Embodiment 3 of the present invention.
Figure 16:
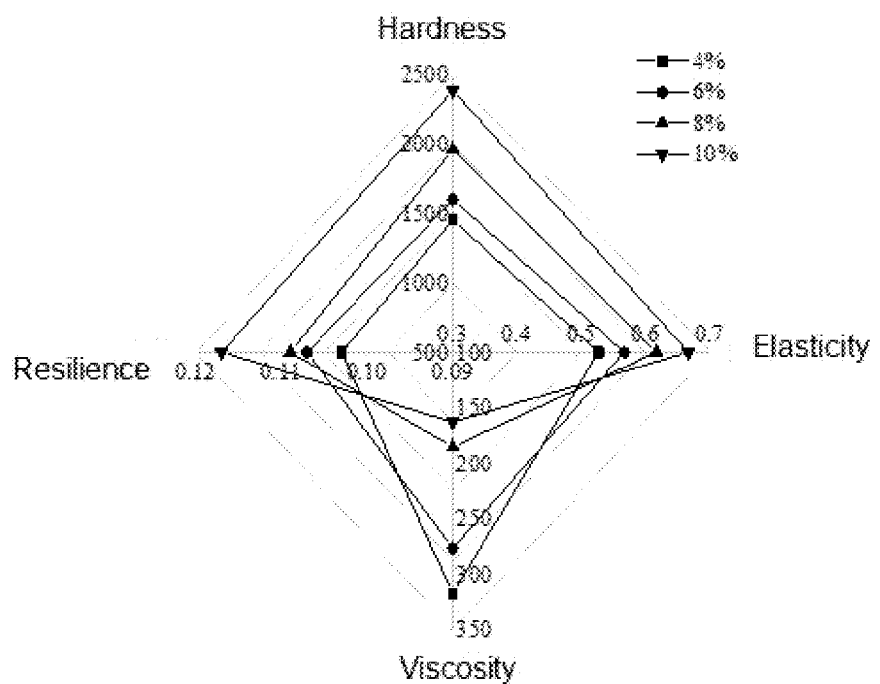
FIG. 16 is the measured results of texture characteristics of the *Pennahia argentata* surimi with different contents of rice starch in Embodiment 3 of the present invention.
Figure 17:
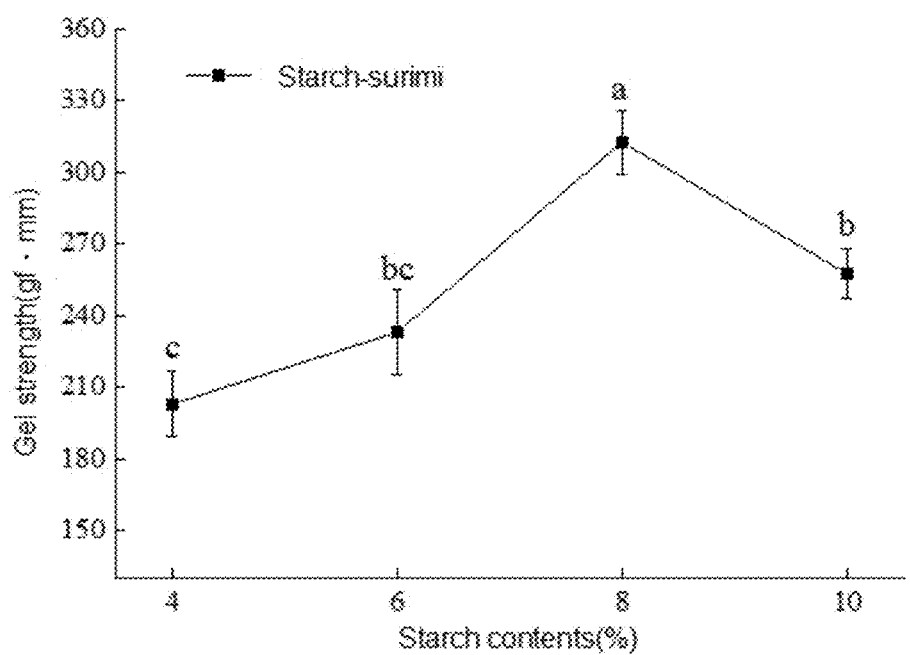
FIG. 17 is the measured results of gel strength of the *Pennahia argentata* surimi with different contents of rice starch in Embodiment 3 of the present invention.
Figure 18:
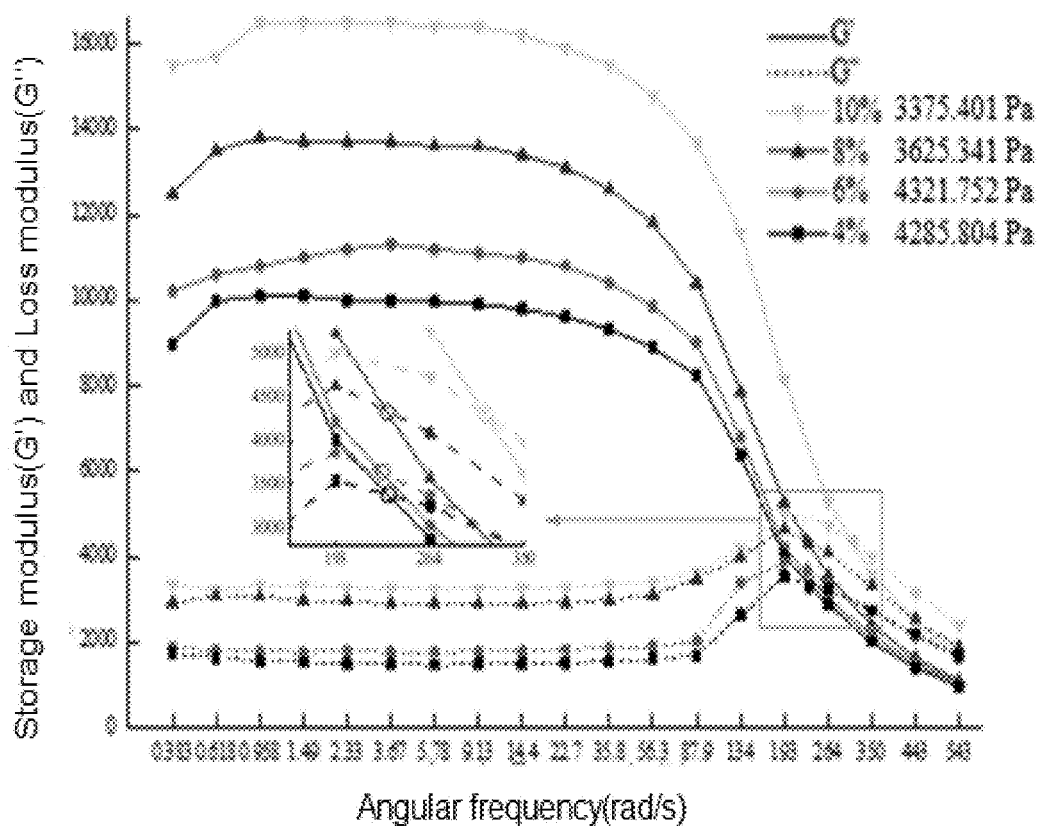
FIG. 18 is the measured results of yield stress of the *Pennahia argentata* surimi with different contents of rice starch in Embodiment 3 of the present invention.
Figure 19:
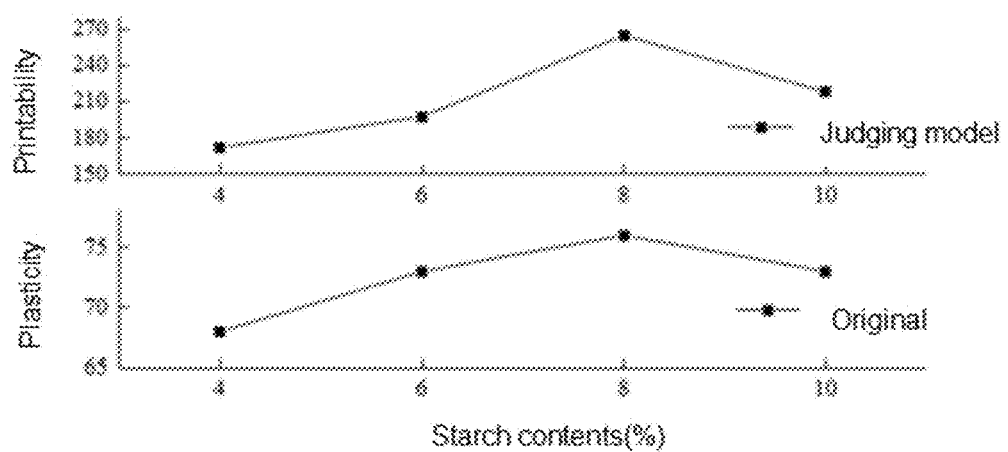
FIG. 19 is the schematic diagram of the judged results of 3D printability of the *Pennahia argentata* surimi with different contents of rice starch in Embodiment 3 of the present invention.

In this embodiment, the 3D printability of *Pennahia argentata* surimi with different contents of rice starch is judged.

Wherein FIG. 14 is a 3D printing effect diagram of the *Pennahia argentata* surimi with different contents of rice starch at different inclination angles; FIG. 15 is the score results of characterizing the plasticity of the *Pennahia argentata* surimi with different contents of rice starch; FIG. 16 is the measured results of texture characteristics of the *Pennahia argentata* surimi with different contents of rice starch; FIG. 17 is the measured results of gel strength of the *Pennahia argentata* surimi with different contents of rice starch; FIG. 18 is the measured results of yield stress of the *Pennahia argentata* surimi with different contents of rice starch; And FIG. 19 is the judged results of 3D printability of the *Pennahia argentata* surimi with different contents of rice starch. What's more, the viscosity coefficient k and Power-law index n of *Pennahia argentata* surimi with different contents of rice starch are shown in Table 6, and the correlation analysis results are shown in Table 7.

From Table 7, it can be seen that the gel strength is the maximum influencing factor of the 3D printability of *Pennahia argentata* surimi with different rice starch contents. Therefore, after normalizing the other influencing factors based on the measured value of the gel strength, the judging model is established, as shown in the following formula:

$$Y=0.579*(0.555c)+0.678*(0.593c)-0.767*(0.768c)+0.544*(0.451c)+0.921c-0.905*(0.787c)-0.714*(0.578c)+0.809*(0.830c)$$

where c represents the measured value of gel strength of *Pennahia argentata* surimi with different contents of rice starch.

According to FIG. 19, the influence results of 3D printability of *Pennahia argentata* surimi with different rice starch contents obtained from the judging model are consistent with the actual printing effect of *Pennahia argentata* surimi with different rice starch contents.

TABLE 6

| | | $\tau = k\lambda^n$ | | |
|---|---|---|---|---|
| Samples | | k | n | $R^2$ |
| Pennahia argentata surimi with different contents of the rice starch | 4% | 6129.146 | −0.0646 | 0.964 |
| | 6% | 2848.417 | −0.2385 | 0.984 |
| | 8% | 1405.732 | −0.2869 | 0.991 |
| | 10% | 1139.605 | −0.4172 | 0.943 |

TABLE 7

| | | Plasticity | Starch contents | Hardness | Elasticity | Viscosity | Resilience | Gel strength | k | n | Yield stress |
|---|---|---|---|---|---|---|---|---|---|---|---|
| Plasticity | Correlation | 1 | .701* | .579* | .678* | −.767** | .544 | .921** | −.905** | −.714** | .80 |
| | Significance | | .011 | .049 | .015 | .004 | .067 | .000 | .000 | .009 | .001 |
| Starch contents | Correlation | .701* | 1 | .984** | .993** | −.976** | .732** | .639* | −.927** | −.979** | .948** |
| | Significance | .011 | | .000 | .000 | .000 | .007 | .025 | .000 | .000 | .000 |
| Hardness | Correlation | .579* | .984** | 1 | .977** | −.956** | .710** | .555 | −.848** | −.942** | .920** |
| | Significance | .049 | .000 | | .000 | .000 | .010 | .061 | .000 | .000 | .000 |
| Elasticity | Correlation | .678* | .993** | .977** | 1 | −.960** | .725** | .593* | −.917** | −.981** | .928** |
| | Significance | .015 | .000 | .000 | | .000 | .008 | .042 | .000 | .000 | .000 |
| Viscosity | Correlation | −.767** | −.976** | −.956** | −.960** | 1 | −.689* | −.768** | .926** | .925** | −.993** |
| | Significance | .004 | .000 | .000 | .000 | | .013 | .004 | .000 | .000 | .000 |
| Resilience | Correlation | .544 | .732** | .710** | .725** | −.689* | 1 | .451 | −.707* | −.735** | .669* |
| | Significance | .067 | .007 | .010 | .008 | .013 | | .141 | .010 | .006 | .017 |
| Gel strength | Correlation | .921** | .639* | .555 | .593* | −.768** | .451 | 1 | −.787 | −.578* | .830** |
| | Significance | .000 | .025 | .061 | .042 | .004 | .141 | | .002 | .049 | .001 |
| k | Correlation | −.905** | −.927** | −.848** | −.917** | .926** | −.707* | −.787** | 1 | .944** | −.924** |
| | Significance | .000 | .000 | .003 | .000 | .000 | .010 | .002 | | .000 | .000 |
| n | Correlation | −.714** | −.979** | −.942** | −.981** | .925** | −.735** | −.578* | −.944** | 1 | −.889** |
| | Significance | .009 | .000 | .000 | .000 | .000 | .006 | .049 | .000 | | .000 |
| Yield stress | Correlation | .809** | .948** | .920** | .928** | −.993** | .669* | .830** | .924** | −.889** | 1 |
| | Significance | .001 | .000 | .000 | .000 | .000 | .017 | .001 | .000 | .000 | |

Embodiment 4

Figure 20:
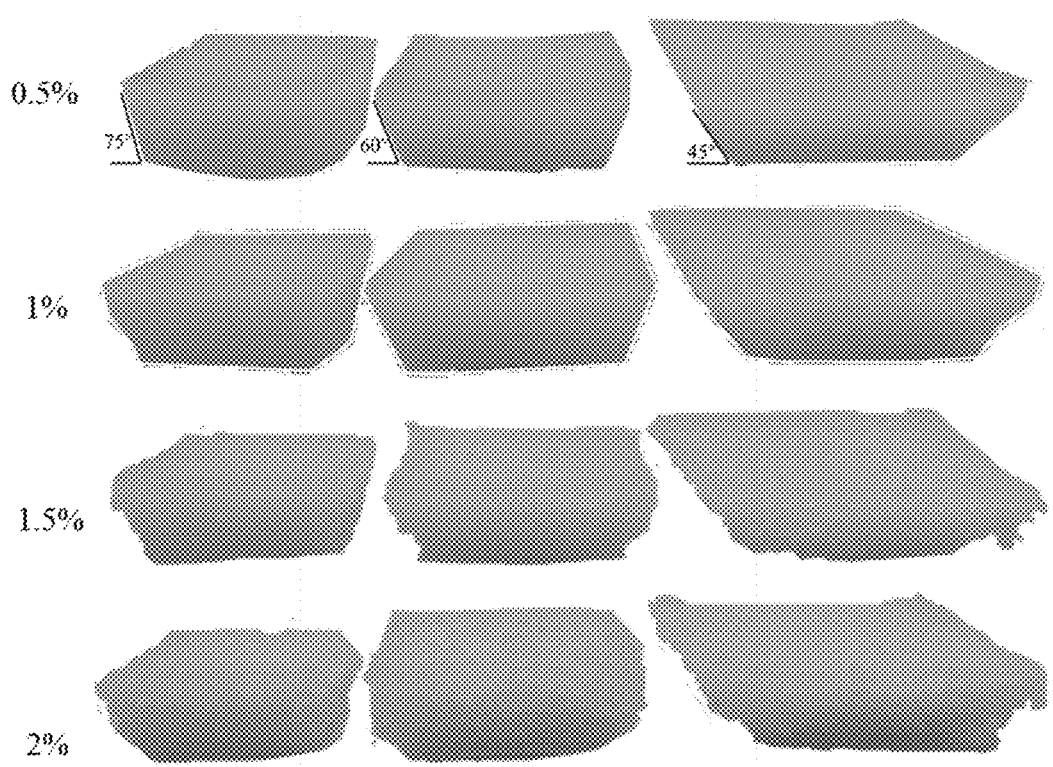
FIG. 20 is a 3D printing effect diagram of the rice starch with different contents of carrageenan at different inclination angles in Embodiment 4 of the present invention.
Figure 21:
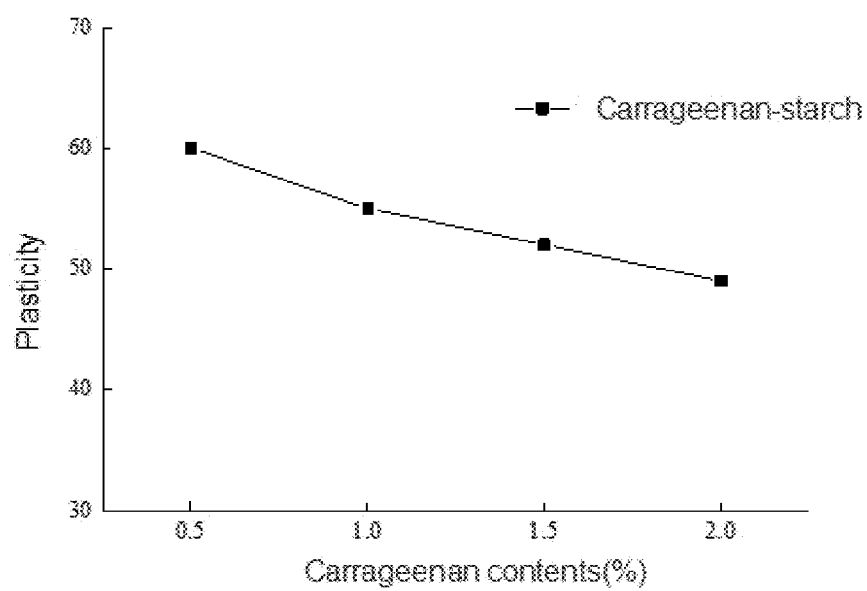
FIG. 21 is the score results of characterizing the plasticity of the rice starch with different contents of carrageenan in Embodiment 4 of the present invention.
Figure 22:
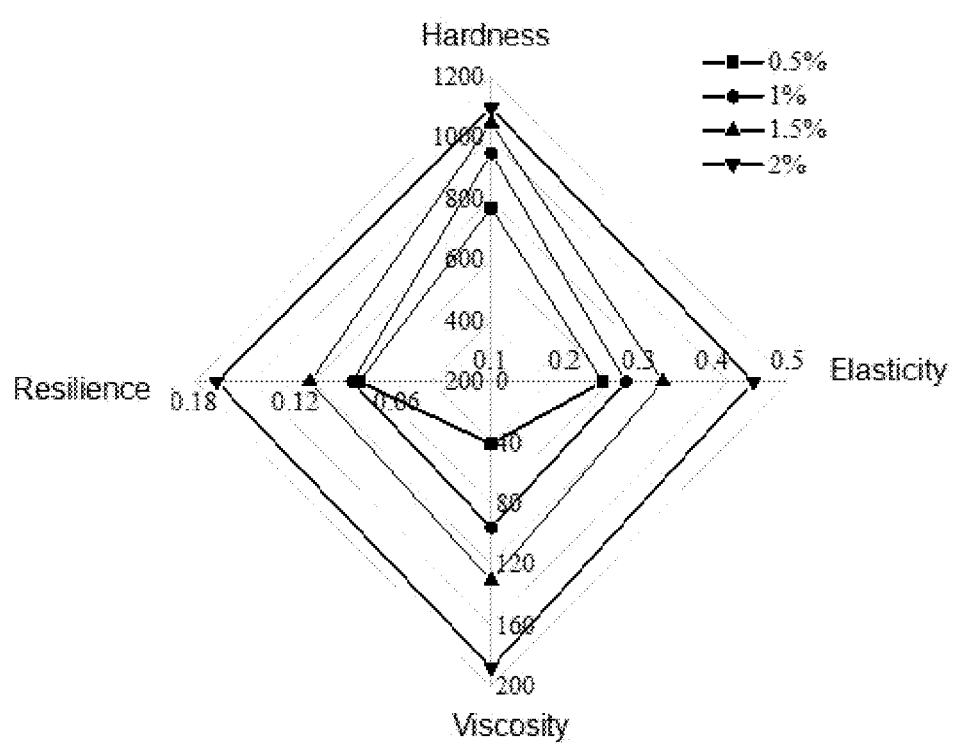
FIG. 22 is the measured results of texture characteristics of the rice starch with different contents of carrageenan in Embodiment 4 of the present invention.
Figure 23:
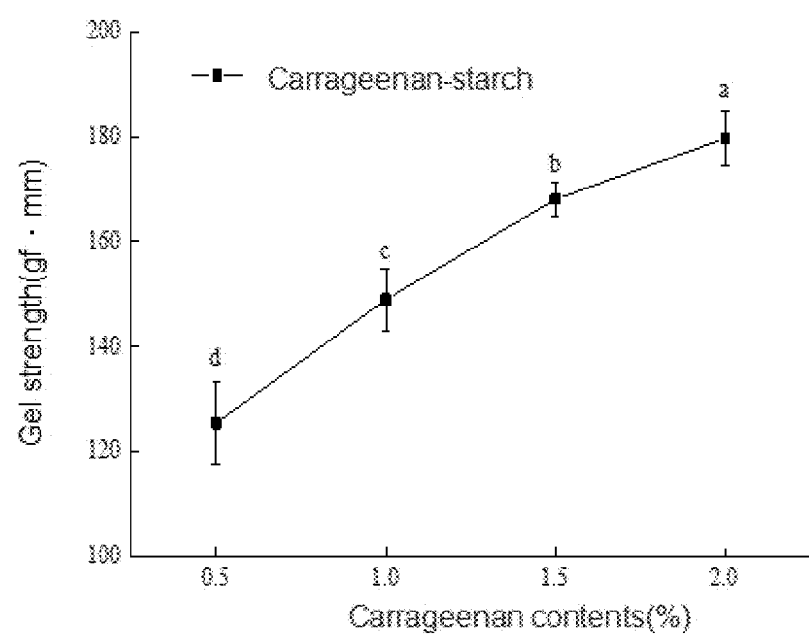
FIG. 23 is the measured results of gel strength of the rice starch with different contents of carrageenan in Embodiment 4 of the present invention.
Figure 24:
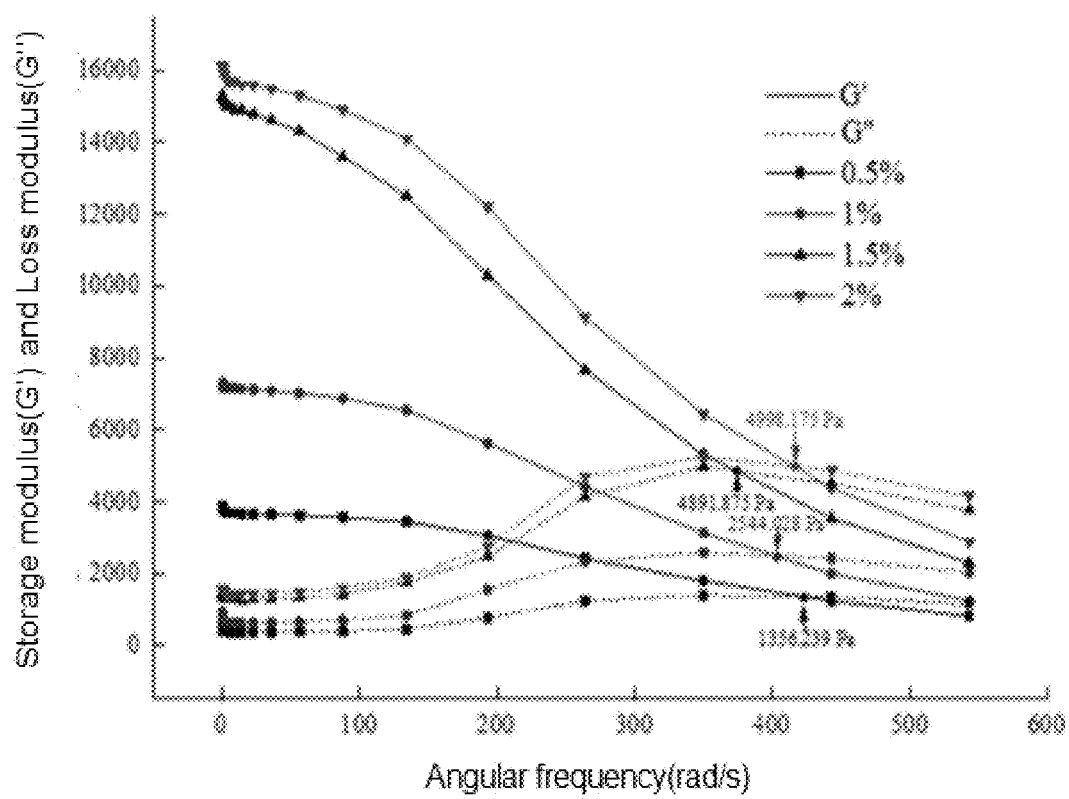
FIG. 24 is the measured results of yield stress of the rice starch with different contents of carrageenan in Embodiment 4 of the present invention.
Figure 25:
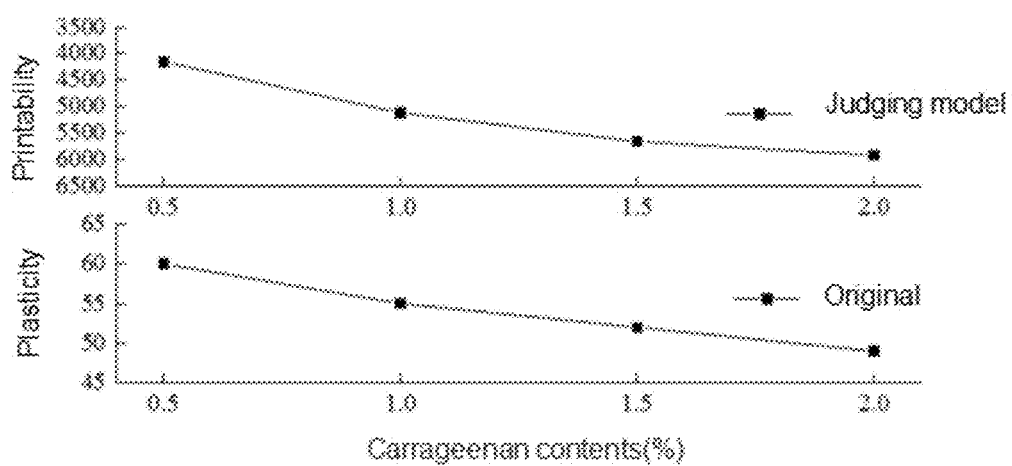
FIG. 25 is the schematic diagram of the judged results of 3D printability of the rice starch with different contents of carrageenan in Embodiment 4 of the present invention.

In this embodiment, the 3D printability of rice starch with different contents of carrageenan is judged.

Wherein FIG. 20 is a 3D printing effect diagram of the rice starch with different contents of carrageenan at different inclination angles; FIG. 21 is the score results of characterizing the plasticity of the rice starch with different contents of carrageenan: FIG. 22 is the measured results of texture characteristics of the rice starch with different contents of carrageenan; FIG. 23 is the measured results of gel strength of the rice starch with different contents of carrageenan; FIG. 24 is the measured results of yield stress of the rice starch with different contents of carrageenan; And FIG. 25 is the judged results of 3D printability of the rice starch with different contents of carrageenan. In addition, the viscosity coefficient k and Power-law index n of rice starch with different contents of carrageenan are shown in Table 8, and the correlation analysis results are shown in Table 9.

TABLE 8

$$\tau = k\lambda^n$$

| Samples | | k | n | $R^2$ |
|---|---|---|---|---|
| Rice starch with different contents of carrageenan | 0.50% | 1144.195 | −0.1729 | 0.953 |
| | 1% | 5977.23 | −0.5442 | 0.979 |
| | 1.50% | 8064.919 | −0.551 | 0.939 |
| | 2% | 14092.89 | −0.8442 | 0.924 |

TABLE 9

| | | Plasticity | Carrageenan contents | Hardness | Elasticity | Viscosity | Resilience | Gel strength | k | n | Yield stress |
|---|---|---|---|---|---|---|---|---|---|---|---|
| Plasticity | Correlation | 1 | −.992** | −.964** | −.922** | −.975** | −.904** | −.989** | −.956** | .910** | −.982** |
| | Significance | | .000 | .000 | .000 | .000 | .000 | .000 | .000 | .000 | .000 |
| Carrageenan contents | Correlation | −.964** | 1 | .964** | .946** | .993* | .927** | .991** | .985** | −.950** | .954** |
| | Significance | .000 | | .000 | .000 | .000 | .000 | .000 | .000 | .000 | .000 |
| Hardness | Correlation | −.992** | .964** | 1 | .845** | .960** | .804** | .989** | .935** | −.942** | .962** |
| | Significance | .000 | .000 | | .001 | .000 | .002 | .000 | .000 | .000 | .000 |
| Elasticity | Correlation | −.922** | .946** | .845** | 1 | .948** | .993** | .903** | .959** | −.890** | .839** |
| | Significance | .000 | .000 | .001 | | .000 | .000 | .000 | .000 | .000 | .001 |
| Viscosity | Correlation | −.975** | .993** | .960** | .948** | 1 | .929** | .983** | .991** | −.967** | .926** |
| | Significance | .000 | .000 | .000 | .000 | | .000 | .000 | .000 | .000 | .000 |
| Resilience | Correlation | −.904** | .927** | .804** | .993** | .929** | 1 | .874** | .938** | −.854** | .815** |
| | Significance | .000 | .000 | .002 | .000 | .000 | | .000 | .000 | .000 | .001 |
| Gel strength | Correlation | −.989** | .991** | .989** | .903** | .983** | .874** | 1 | .965** | −.948** | .971** |
| | Significance | .000 | .000 | .000 | .000 | .000 | .000 | | .000 | .000 | .000 |
| k | Correlation | −.956** | .985** | .935** | .959** | .991** | .938** | .965** | 1 | −.978** | .890** |
| | Significance | .000 | .000 | .000 | .000 | .000 | .000 | .000 | | .000 | .000 |
| n | Correlation | .910** | −.950** | −.942** | −.890** | −.967** | −.854** | −.948** | −.978** | 1 | −.849** |
| | Significance | .000 | .000 | .000 | .000 | .000 | .000 | .000 | .000 | | .000 |
| Yield stress | Correlation | −.982** | .954** | .962** | .839** | .926** | .815** | .971** | .890** | −.849** | 1 |
| | Significance | .000 | .000 | .000 | .001 | .000 | .001 | .000 | .000 | .000 | |

From Table 9, it can be seen that hardness is the maximum influencing factor of the 3D printability of rice starch with different contents of carrageenan. Therefore, after normalizing the other influencing factors based on the measured value of the hardness, the judging model is established, as shown in the following formula:

$$Y = -0.992d - 0.922*(0.845d) - 0.975*(0.960d) - 0.904*(0.804d) - 0.989*(0.989d) - 0.956*(0.935d) + 0.910*(0.942d) - 0.982*(0.962d)$$

where d represents the hardness of rice starch with different contents of carrageenan.

According to FIG. 25, the influence results of 3D printability of rice starch with different contents of carrageenan obtained from the evaluation model are consistent with the actual printing effect of rice starch with different contents of carrageenan.

The above-mentioned embodiments only describe the preferred mode of the invention, but do not limit the scope of the invention. On the premise of not departing from the design spirit of the invention, all kinds of modifications and improvements made by ordinary technicians in the field to the technical scheme of the invention shall fall within the scope of protection determined by the claims of the invention.

What is claimed is:

1. A method for judging printability of food materials under different conditions, comprising following steps:
    acquiring plasticity of food materials to be judged according to three-dimensional (3D) printing results of the food materials to be judged;
    acquiring measured values of each of influencing factors according to the influencing factors of a 3D printing effect of the food materials to be judged;
    performing correlation analysis between the plasticity and each of the measured values of the influencing factors, and obtaining a first correlation value between the plasticity and each of the influencing factors and a second correlation value between each two of the influencing factors;
    acquiring an influencing factor with a highest correlation with the plasticity according to the first correlation value, namely a maximum influencing factor, and normalizing the measured values of each of the influencing factors according to a measured value of the maximum influencing factor and the second correlation value;
    wherein the normalizing the measured values of each of the influencing factors comprises:
    multiplying the maximum influencing factor and the second correlation value between the maximum influencing factor and each of the influencing factors to obtain normalized processing results of the measured values of each of the influencing factors;
    constructing a judging model according to the normalized measured values of each of the influencing factors and the first correlation value between each of the influencing factors and the plasticity; wherein the judging model being used for judging characterizing the printability of the food materials under different conditions; and
    applying a result of the characterization of the printability of the food materials in actual food 3D printing.

2. The method for judging printability of food materials according to claim 1, wherein the influencing factors comprise texture characteristics, gel strength and rheological characteristics.

3. The method for judging printability of food materials according to claim 2, wherein the texture characteristics comprise hardness, elasticity, resilience and viscosity; and the rheological characteristics comprise yield stress, a viscosity coefficient and a Power-law index, and the viscosity coefficient and the Power-law index are simulated by a Power-law model.

4. The method for judging printability of food materials according to claim 1, wherein the construction of the judging model comprises: summing products of the normalized measured values of each of the influencing factors and the first correlation value between each of the influencing factors and the plasticity to obtain the judging model.

5. The method for judging printability of food materials according to claim 4, wherein after constructing the judging model, the method further comprises: under a condition to be measured, acquiring the measured value of the maximum influencing factor of the food materials to be judged and inputting the measured value of the maximum influencing factor of the food materials to be judged into the judging model to obtain a judging value of the printability of the food materials to be judged under the condition to be measured.

6. A device for judging printability of food materials under different conditions, comprising:
   a computer system having a memory and processor, wherein the computer system having a set of modules stored on the memory and processed by the processor;
   a first data acquisition module, configured to acquire plasticity of food materials to be judged according to 3D printing results of the food materials to be judged;
   a second data acquisition module, configured to acquire measured values of each of influencing factors of a 3D printing effect of the food materials to be judged;
   a correlation analysis module, configured to perform correlation analysis between the plasticity and each of the measured values of the influencing factors to obtain a first correlation value between the plasticity and each of the influencing factors and a second correlation value between each two of the influencing factors;
   a data processing module, configured to acquire an influencing factor with a highest correlation with the plasticity according to the first correlation value, namely a maximum influencing factor, and normalize the measured values of each of the influencing factors according to a measured value of the maximum influencing factor and the second correlation value; wherein the normalize the measured values of each of the influencing factors comprises:
   multiplying the maximum influencing factor and the second correlation value between the maximum influencing factor and each of the influencing factors to obtain normalized processing results of the measured values of each of the influencing factors; and
   a judging model constructing module, configured to construct a judging model according to the normalized measured values of each of the influencing factors and the first correlation value between each of the influencing factors and the plasticity; wherein the judging model being used for judging characterizing the printability of the food materials under different conditions; and sending a result of the characterization of the printability of the food materials to a 3D printer for actual food 3D printing.

7. An electronic device comprising a memory, a processor, and a computer program stored in the memory and executable on the processor, wherein when the processor executes the computer program, the steps of the method for judging printability of food materials according to claim 1 are implemented.

8. A non-transitory computer readable storage medium with a computer program stored on, wherein when the computer program is executed by a processor, the steps of the method for judging printability of food materials according to claim 1 are implemented.

* * * * *